(12) United States Patent
Chen et al.

(10) Patent No.: US 10,132,690 B2
(45) Date of Patent: Nov. 20, 2018

(54) TEMPERATURE SENSING SYSTEM INTEGRATED IN LIQUID CRYSTAL DISPLAY PANEL AND LIQUID CRYSTAL DISPLAY PANEL

(71) Applicant: Shenzhen China Star Optoelectronics Technology Co., Ltd., Shenzhen (CN)

(72) Inventors: Yuyeh Chen, Shenzhen (CN); Yuhua Chang, Shenzhen (CN); Mingwei Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 338 days.

(21) Appl. No.: 15/039,412

(22) PCT Filed: Apr. 13, 2016

(86) PCT No.: PCT/CN2016/079162
§ 371 (c)(1),
(2) Date: May 25, 2016

(87) PCT Pub. No.: WO2017/152466
PCT Pub. Date: Sep. 14, 2017

(65) Prior Publication Data
US 2018/0087971 A1 Mar. 29, 2018

(30) Foreign Application Priority Data
Mar. 9, 2016 (CN) .......................... 2016 1 0132575

(51) Int. Cl.
*G01K 1/00* (2006.01)
*G01K 7/00* (2006.01)
(Continued)

(52) U.S. Cl.
CPC ................. *G01K 1/14* (2013.01); *G01K 7/04* (2013.01); *G02F 1/13306* (2013.01); *G09G 3/36* (2013.01);
(Continued)

(58) Field of Classification Search
USPC .......................................... 374/141, 208, 163
See application file for complete search history.

(56) References Cited

U.S. PATENT DOCUMENTS 5,929,833 A * 7/1999 Koshobu .............. G09G 3/3629
345/101
9,366,891 B2 * 6/2016 Sano .................... G09G 3/3406
(Continued)

*Primary Examiner* — Mirellys Jagan
(74) *Attorney, Agent, or Firm* — Leong C. Lei

(57) ABSTRACT

The present invention provides a temperature sensing system integrated in a liquid crystal display panel and a liquid crystal display panel. The temperature sensing system includes a sensing unit (11), located in a display region (1) of the liquid crystal display panel, and a calculation and control unit (12), located outside the display region (1); the sensing unit (11) includes a first metal conductor (A) and a second metal conductor (B) located in the display region (1), and as a short circuit point exists between the two, a voltage difference generates between the two, and the voltage difference is converted into a digital signal with an analog to digital converter (122) after it is amplified by an operational amplifier (121), and finally, the micro controller unit (123) processes the digital signal to obtain a temperature in the liquid crystal display panel and to determine whether the protect temperature is reached.

10 Claims, 2 Drawing Sheets

(51) Int. Cl.
*G01K 1/14* (2006.01)
*G01K 7/04* (2006.01)
*G02F 1/133* (2006.01)
*G09G 3/36* (2006.01)
*G02F 1/13* (2006.01)

(52) U.S. Cl.
CPC ..... *G02F 1/1309* (2013.01); *G09G 2330/045* (2013.01)

(56) References Cited

U.S. PATENT DOCUMENTS

| | | | |
|---|---|---|---|
| 2004/0150606 A1* | 8/2004 | Preston | G09G 3/3685 345/100 |
| 2007/0234747 A1* | 10/2007 | Chen | G01K 13/02 62/149 |
| 2008/0048994 A1* | 2/2008 | Lee | G06F 3/0412 345/173 |
| 2010/0013817 A1* | 1/2010 | Ryu | G09G 3/3688 345/211 |
| 2010/0044361 A1* | 2/2010 | Lin | H05B 1/0227 219/209 |
| 2010/0277519 A1* | 11/2010 | Lee | G09G 3/3406 345/691 |
| 2012/0105422 A1* | 5/2012 | Zhao | G09G 3/36 345/212 |
| 2012/0223932 A1* | 9/2012 | Zhao | G09G 3/3696 345/212 |
| 2015/0035737 A1* | 2/2015 | Takatori | G09G 3/2014 345/87 |
| 2017/0167924 A1* | 6/2017 | Cheng | G01K 1/14 |
| 2018/0090103 A1* | 3/2018 | Zhang | G01K 7/18 |

* cited by examiner

TEMPERATURE SENSING SYSTEM INTEGRATED IN LIQUID CRYSTAL DISPLAY PANEL AND LIQUID CRYSTAL DISPLAY PANEL

FIELD OF THE INVENTION

The present invention relates to a display technology field, and more particularly to a temperature sensing system integrated in a liquid crystal display panel and a liquid crystal display panel.

BACKGROUND OF THE INVENTION

The LCD (Liquid Crystal Display) possesses many advantages of being ultra thin, power saved and radiation free. It has been widely utilized in, such as LCD TVs, mobile phones, Personal Digital Assistant (PDA), digital cameras, laptop screens or notebook screens, and dominates the flat panel display field.

Most of the liquid crystal displays on the present market are backlight type liquid crystal displays, which comprise a liquid crystal display panel and a backlight module. The working principle of the liquid crystal display panel is that the Liquid Crystal is injected between the Thin Film Transistor Array Substrate (TFT array substrate) and the Color Filter (CF). The light of backlight module is refracted to generate images by applying driving voltages to the two substrates for controlling the rotations of the liquid crystal molecules.

With the constant development of the industry manufacture technology of the liquid crystal display, the cost decrease has already become one of the most development directions in the present industry. Except optimizing the manufacture process of the liquid crystal display, and developing new material to reduce the production cost, the technology of integrating the related function modules, circuits inside the liquid crystal display panel, such as directly manufacturing the gate scan drive circuit on the thin film transistor array substrate with the array manufacture process (Gate Driver on Array, GOA) to replace the external gate scan drive IC is also the popular content of the developments which many liquid crystal display panel makers compete to involve for reducing the production cost in advance.

As conducting the high integration liquid crystal display panel manufacture process, it requires the manufacture environment which is severer. If the particles in the manufacture environment, the metal particles generated by the production apparatus fall on the glass substrate in the manufacture process, it does not only result in the bad quality of the liquid crystal display panel but also the short circuit phenomenon in the circuit. Such short circuit phenomenon causes the image display abnormal, and the continuous usage will make the temperature of the circuit raise and even the burning of the liquid crystal display panel. If the short circuit in the circuit cannot be detected in the production, the product must have highly possible quality risk and the yield descends, which results in the customer complaints and the Call Back of the products. It leads to the massive production cost increase.

The temperature detection to the inside of the liquid crystal display panel according to prior art is accomplished with the temperature detection component outside the liquid crystal display panel. The result of the external temperature detection component must be restricted by the position, and cannot perform detection to the arbitrary positions inside the entire liquid crystal display panel, and the detection precision is not enough.

SUMMARY OF THE INVENTION

An objective of the present invention is to provide a temperature sensing system integrated in a liquid crystal display panel, which can conveniently, accurately sense the temperature change due to the short circuit in the liquid crystal display panel to prevent the panel burning due to the overheat in the liquid crystal display panel and to raise the production yield.

Another objective of the present invention is to provide a liquid crystal panel, having a temperature sensing system inside which can conveniently, accurately sense the temperature change due to the short circuit in the liquid crystal display panel to prevent the panel burning due to the overheat in the liquid crystal display panel and to raise the production yield.

For realizing the aforesaid objectives, the present invention first provides a temperature sensing system integrated in a liquid crystal display panel, comprising a sensing unit, located in a display region of the liquid crystal display panel, and a calculation and control unit, located outside the display region of the liquid crystal display panel and electrically coupled to the sensing unit;

the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel;

the calculation and control unit comprises an operational amplifier electrically coupled to the sensing unit, and an analog to digital converter electrically coupled to the operational amplifier, and a micro controller unit electrically coupled to the analog to digital converter.

The first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit.

The calculation and control unit is located on a printed circuit board outside the display region of the liquid crystal display panel.

Connection lines among the first metal conductor, the second metal conductor and the operational amplifier, a connection line between the operational amplifier and the analog to digital converter, and a connection line between the analog to digital converter and the micro controller unit are all copper lines.

The present invention further provides a liquid crystal display panel, having a temperature sensing system integrated in the liquid crystal display panel, and the temperature sensing system comprises a sensing unit, located in a display region of the liquid crystal display panel, and a calculation and control unit, located outside the display region of the liquid crystal display panel and electrically coupled to the sensing unit;

the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel;

the calculation and control unit comprises an operational amplifier electrically coupled to the sensing unit, and an analog to digital converter electrically coupled to the operational amplifier, and a micro controller unit electrically coupled to the analog to digital converter.

The first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit.

The calculation and control unit is located on a printed circuit board outside the display region of the liquid crystal display panel.

Connection lines among the first metal conductor, the second metal conductor and the operational amplifier, a connection line between the operational amplifier and the analog to digital converter, and a connection line between the analog to digital converter and the micro controller unit are all copper lines.

The present invention further provides a temperature sensing system integrated in a liquid crystal display panel, comprising a sensing unit, located in a display region of the liquid crystal display panel, and a calculation and control unit, located outside the display region of the liquid crystal display panel and electrically coupled to the sensing unit;

the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel;

the calculation and control unit comprises an operational amplifier electrically coupled to the sensing unit, and an analog to digital converter electrically coupled to the operational amplifier, and a micro controller unit electrically coupled to the analog to digital converter;

wherein the first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit;

wherein the calculation and control unit is located on a printed circuit board outside the display region of the liquid crystal display panel.

The benefits of the present invention are: the present invention provides the temperature sensing system integrated in the liquid crystal display panel. The sensing unit is located in the display region of the liquid crystal display panel, and the calculation and control unit is located outside the display region of the liquid crystal display panel. The sensing unit comprises the first metal conductor and the second metal conductor, and materials of the first metal conductor and the second metal conductor are different, and as the short circuit point exists between the first metal conductor and the second metal conductor, a voltage difference generates between the first metal conductor and the second metal conductor according to the seebeck effect, and the voltage difference is converted into the digital signal with the analog to digital converter after it is amplified by an operational amplifier in the calculation and control unit, and finally, the micro controller unit processes the digital signal to obtain the temperature in the liquid crystal display panel and to determine whether the protect temperature is reached for self-protection in time, which can conveniently, accurately sense the temperature change due to the short circuit in the liquid crystal display panel to prevent the panel burning due to the overheat in the liquid crystal display panel and to raise the production yield. The present invention provides a liquid crystal panel, having a temperature sensing system inside which can conveniently, accurately sense the temperature change due to the short circuit in the liquid crystal display panel to prevent the panel burning due to the overheat in the liquid crystal display panel and to raise the production yield.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
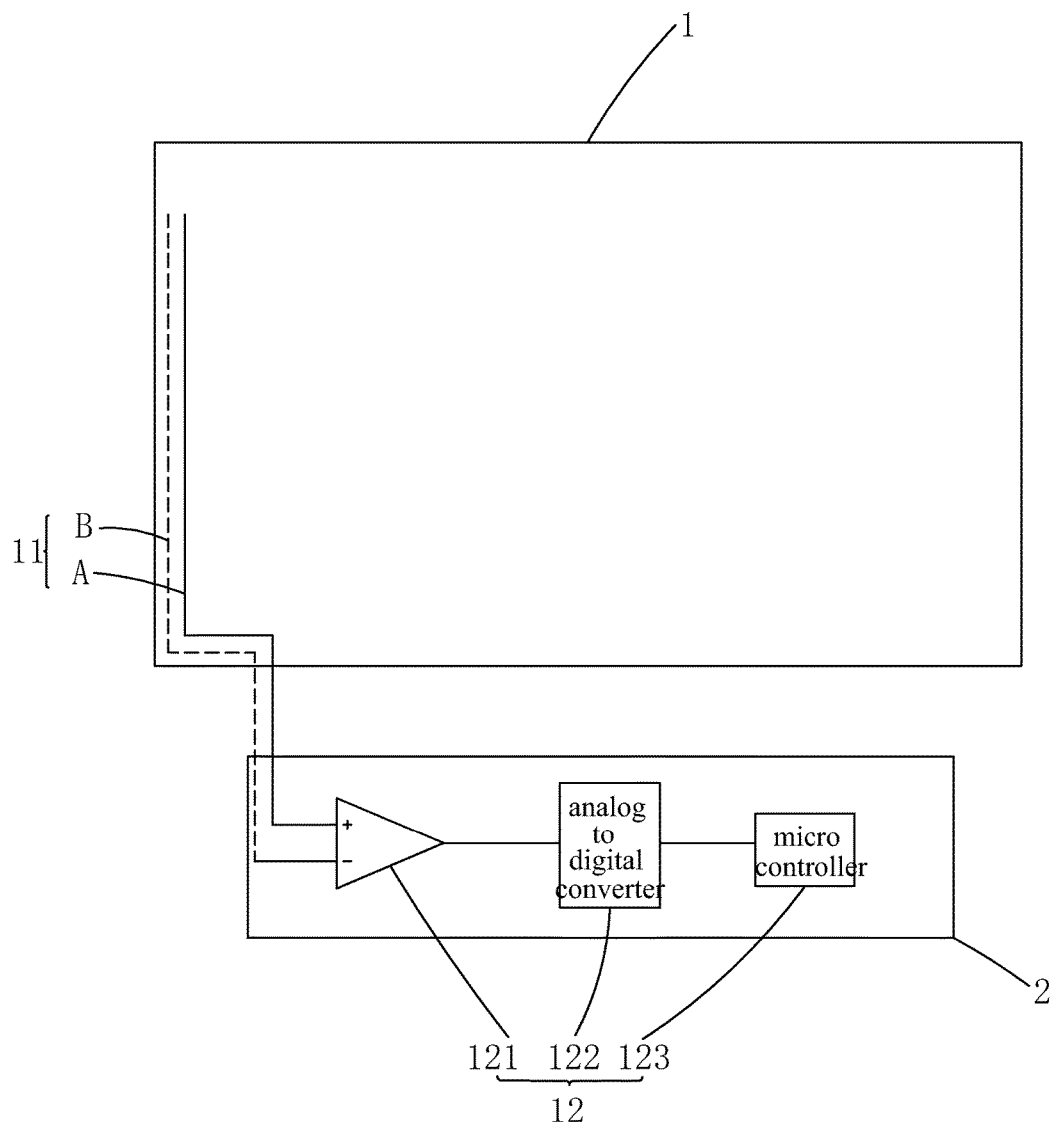
FIG. 1 is a structure block diagram of a temperature sensing system integrated in a liquid crystal display panel according to the present invention.
Figure 2:
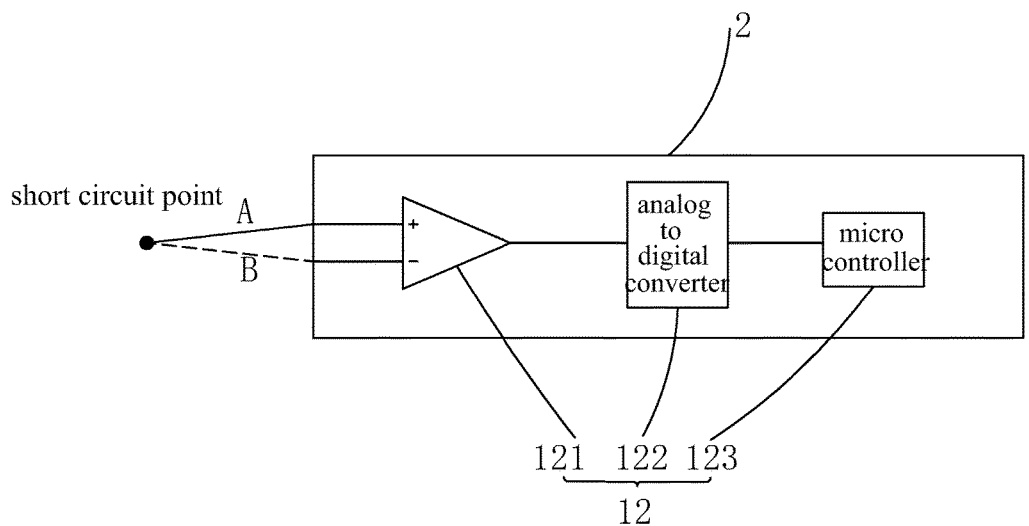
FIG. 2 is an equivalent circuit diagram of a temperature sensing system integrated in a liquid crystal display panel according to the present invention.

Please refer to FIG. 1 and FIG. 2. The present invention first provides a temperature sensing system integrated in a liquid crystal display panel, comprising a sensing unit 11, located in a display region 1 of the liquid crystal display panel, and a calculation and control unit 12, located outside the display region 1 of the liquid crystal display panel and electrically coupled to the sensing unit 11.

The sensing unit 11 comprises a first metal conductor A and a second metal conductor B located in the display region 1 of the liquid crystal display panel, and materials of the first metal conductor A and the second metal conductor B are different. Specifically, the first metal conductor A and the second metal conductor B can be a first metal line and a second metal line located on respective metal structures and respective wirings in the display region 1 of the liquid crystal display panel. For instance, in prior art, the TFT array substrate of the liquid crystal display panel is formed with a first metal structure layer of a TFT gate and a scan line, and is also formed with a second metal structure layer of a TFT source/drain and a data line, and then, the first metal structure layer comprises the first metal line and the second metal line, and the second metal structure layer also comprises the first metal line and the second metal line; the first metal conductor A and the second metal conductor B also can be different metal structure layers and wirings in the display region 1 of the liquid crystal display panel, respectively. For instance, in prior art, the TFT array substrate of the liquid crystal display panel is formed with the first metal structure layer of the TFT gate and the scan line, and is also formed with the second metal structure layer of the TFT source/drain and the data line, and then, the first metal structure layer itself can be employed to be the first metal conductor A, and the second metal structure layer is employed to be the second metal conductor B.

The calculation and control unit 12 comprises an operational amplifier (OA) 121 electrically coupled to the sensing unit 11, and an analog to digital converter (ADC) 122 electrically coupled to the operational amplifier 121, and a micro controller unit (MCU) 123 electrically coupled to the analog to digital converter 122. Specifically, the calculation and control unit 12 is located on a printed circuit board 2 outside the display region 1 of the liquid crystal display panel. The first metal conductor A and the second metal conductor B are electrically coupled to an in phase input end and an anti-phase input end of the operational amplifier 121, respectively; an output end of the operational amplifier 121 is electrically coupled to an input end of the analog to digital converter 122 through a copper line; an output end of the analog to digital converter 122 is electrically coupled to the micro controller unit 123 through a copper line.

Figure 3:
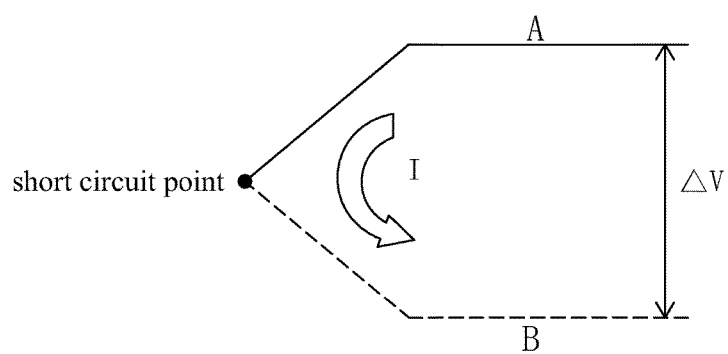
FIG. 3 is a diagram of the voltage difference generated as the short circuit point exists between the first metal conductor and the second metal conductor in the temperature sensing system integrated in the liquid crystal display panel according to the present invention.

With combination of FIG. 3, because the materials of the first metal conductor A and the second metal conductor B are different, according to the seebeck effect, i.e. as a short circuit point exists between the first metal conductor and the second metal conductor, the first metal conductor A and the second metal conductor B compose a loop. Because the short circuit point will generate heat, the heat current I will appear in the circuit. Correspondingly, the thermoelectromotive force generates between the first metal conductor A and the second metal conductor B. Namely, the voltage difference ΔV generates between the first metal conductor A and the second metal conductor B, and certainly, the voltage difference ΔV is relatively small.

After the voltage difference ΔV between the first metal conductor A and the second metal conductor B is transmitted to the operational amplifier 121 in the calculation and control unit 12, the operational amplifier 121 amplifies the voltage difference ΔV; the analog to digital converter 122 in the calculation and control unit 12 receives the voltage difference value after being amplified by the operational amplifier 121, and converts the amplified voltage difference value into a digital signal; finally, the micro controller unit 123 in the calculation and control unit 12 processes the digital signal to obtain a temperature in the liquid crystal display panel and to determine whether the protect temperature is reached. If yes, the self-protection function is activated to execute the self-protection to prevent the temperature raises and the panel is burned. Thus, it conveniently, accurately senses the temperature change due to the short circuit in the liquid crystal display panel to prevent the panel burning due to the overheat in the liquid crystal display panel and to raise the production yield.

Significantly, the formation that the first metal conductor A and the second metal conductor B are a first metal line and a second metal line located on respective metal structures and respective wirings in the display region 1 of the liquid crystal display panel is not only applied for the situation that the short circuit happens between the different metal structure layers and the wirings but also is applied for the situation that the short circuit happens for the same metal structure layer or the same wiring itself; As regarding the formation that the first metal conductor A and the second metal conductor B are the different metal structures and wirings themselves in the display region 1 of the liquid crystal display panel, it is only applied for the situation that the short circuit happens between the different metal structure layers and the wirings.

An objective of the present invention further provides a liquid crystal display panel, having the temperature sensing system integrated in the liquid crystal display panel shown in FIG. 1 and FIG. 2, which can conveniently, accurately sense the temperature change due to the short circuit in the liquid crystal display panel to prevent the panel burning due to the overheat in the liquid crystal display panel and the yield of the production is high. The description of the temperature sensing system integrated in the liquid crystal display panel is not repeated here.

In conclusion, in the temperature sensing system integrated in the liquid crystal display panel according to the present invention, the sensing unit is located in the display region of the liquid crystal display panel, and the calculation and control unit is located outside the display region of the liquid crystal display panel. The sensing unit comprises the first metal conductor and the second metal conductor, and materials of the first metal conductor and the second metal conductor are different, and as the short circuit point exists between the first metal conductor and the second metal conductor, a voltage difference generates between the first metal conductor and the second metal conductor according to the seebeck effect, and the voltage difference is converted into the digital signal with the analog to digital converter after it is amplified by an operational amplifier in the calculation and control unit, and finally, the micro controller unit processes the digital signal to obtain the temperature in the liquid crystal display panel and to determine whether the protect temperature is reached for self-protection in time, which can conveniently, accurately sense the temperature change due to the short circuit in the liquid crystal display panel to prevent the panel burning due to the overheat in the liquid crystal display panel and to raise the production yield. In the liquid crystal panel of the present invention, the temperature sensing system of the present invention is located inside, and thus can conveniently, accurately sense the temperature change due to the short circuit in the liquid crystal display panel to prevent the panel burning due to the overheat in the liquid crystal display panel and to raise the production yield.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A temperature sensing system integrated in a liquid crystal display panel, comprising a sensing unit, located in a display region of the liquid crystal display panel, and a calculation and control unit, located outside the display region of the liquid crystal display panel and electrically coupled to the sensing unit; wherein
the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel; and
the calculation and control unit comprises an operational amplifier electrically coupled to the sensing unit, and an analog to digital converter electrically coupled to the operational amplifier, and a micro controller unit electrically coupled to the analog to digital converter.

2. The temperature sensing system integrated in the liquid crystal display panel according to claim 1, wherein the calculation and control unit is located on a printed circuit board outside the display region of the liquid crystal display panel.

3. The temperature sensing system integrated in the liquid crystal display panel according to claim 1, wherein the first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit.

4. The temperature sensing system integrated in the liquid crystal display panel according to claim 3, wherein connection lines among the first metal conductor, the second metal conductor and the operational amplifier, a connection line between the operational amplifier and the analog to digital converter, and a connection line between the analog to digital converter and the micro controller unit are all copper lines.

5. A liquid crystal display panel, having a temperature sensing system integrated in the liquid crystal display panel, and the temperature sensing system comprises a sensing unit, located in a display region of the liquid crystal display panel, and a calculation and control unit, located outside the display region of the liquid crystal display panel and electrically coupled to the sensing unit; wherein
the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel; and
the calculation and control unit comprises an operational amplifier electrically coupled to the sensing unit, and an analog to digital converter electrically coupled to the operational amplifier, and a micro controller unit electrically coupled to the analog to digital converter.

6. The liquid crystal display panel according to claim 5, wherein the calculation and control unit is located on a printed circuit board outside the display region of the liquid crystal display panel.

7. The liquid crystal display panel according to claim 5, wherein the first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit.

8. The liquid crystal display panel according to claim 7, wherein connection lines among the first metal conductor, the second metal conductor and the operational amplifier, a connection line between the operational amplifier and the analog to digital converter, and a connection line between the analog to digital converter and the micro controller unit are all copper lines.

9. A temperature sensing system integrated in a liquid crystal display panel, comprising a sensing unit, located in a display region of the liquid crystal display panel, and a calculation and control unit, located outside the display region of the liquid crystal display panel and electrically coupled to the sensing unit; wherein
the sensing unit comprises a first metal conductor and a second metal conductor located in the display region of the liquid crystal display panel, and materials of the first metal conductor and the second metal conductor are different; the first metal conductor and the second metal conductor are a first metal line and a second metal line located on respective metal structures and respective wirings in the display region of the liquid crystal display panel; or the first metal conductor and the second metal conductor are the respective metal structures and the respective wirings in the display region of the liquid crystal display panel;
the calculation and control unit comprises an operational amplifier electrically coupled to the sensing unit, and an analog to digital converter electrically coupled to the operational amplifier, and a micro controller unit electrically coupled to the analog to digital converter;
wherein the first metal conductor and the second metal conductor are electrically coupled to an in phase input end and an anti-phase input end of the operational amplifier, respectively; an output end of the operational amplifier is electrically coupled to an input end of the analog to digital converter; an output end of the analog to digital converter is electrically coupled to the micro controller unit; and
wherein the calculation and control unit is located on a printed circuit board outside the display region of the liquid crystal display panel.

10. The temperature sensing system integrated in the liquid crystal display panel according to claim 9, wherein connection lines among the first metal conductor, the second metal conductor and the operational amplifier, a connection line between the operational amplifier and the analog to digital converter, and a connection line between the analog to digital converter and the micro controller unit are all copper lines.

* * * * *